Feb. 4, 1930.   A. OLGAY   1,745,581
ENVELOPE FASTENER APPLYING MECHANISM
Original Filed March 5, 1923
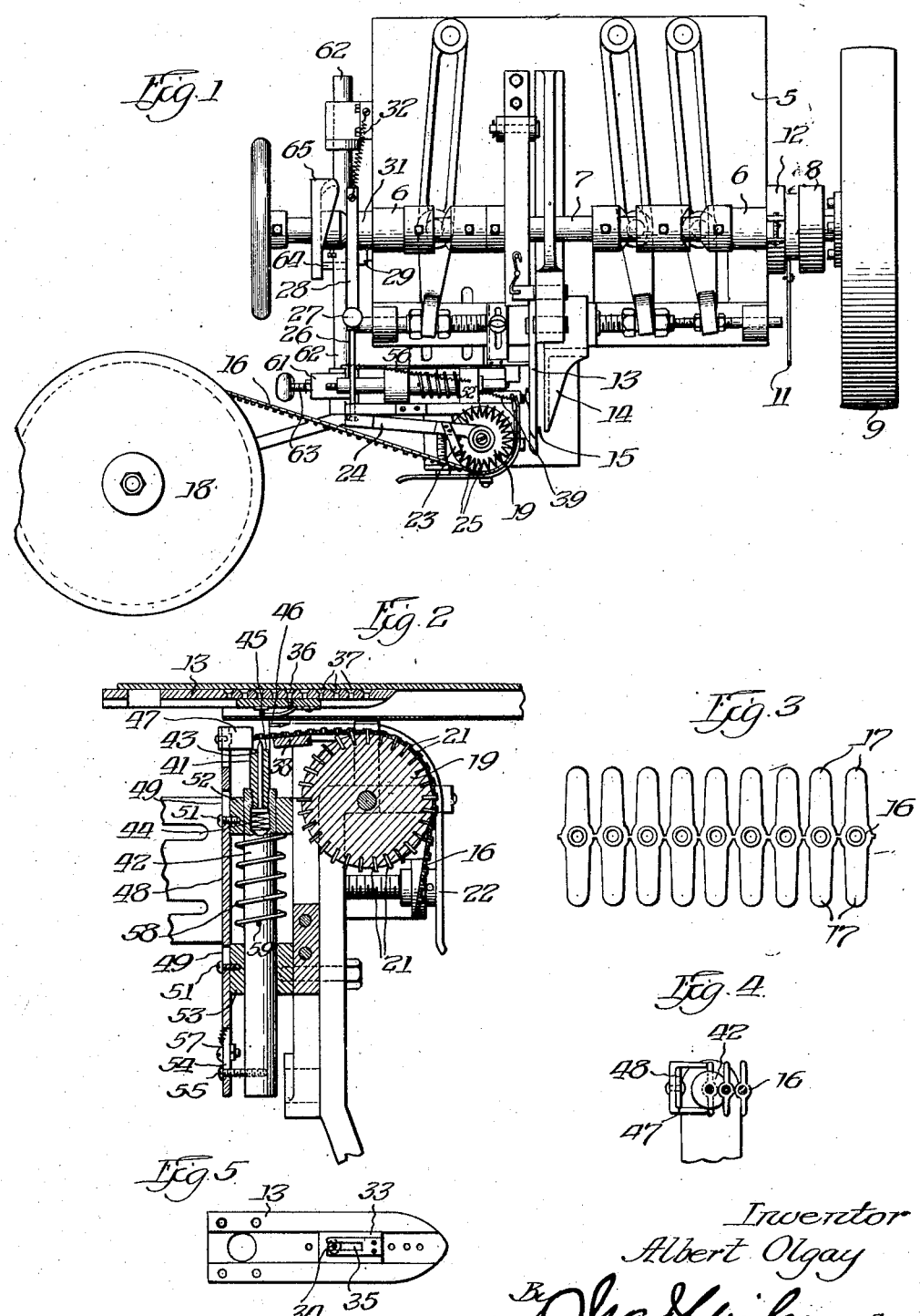
Inventor
Albert Olgay Patented Feb. 4, 1930

1,745,581

UNITED STATES PATENT OFFICE

ALBERT OLGAY, OF GLEN ELLYN, ILLINOIS, ASSIGNOR TO GAW-O'HARA ENVELOPE CO., OF CHICAGO, ILLINOIS, A CORPORATION OF ILLINOIS

ENVELOPE-FASTENER-APPLYING MECHANISM

Original application filed March 5, 1923, Serial No. 622,843. Divided and this application filed January 12, 1924. Serial No. 685,741.

This invention relates to mechanism for applying envelope fasteners to envelope bodies and the present application is a division of my pending application, Serial No. 622,843, filed March 5, 1923.

Heretofore as far as I am aware envelope fasteners, comprising tubular central portions or bodies adapted to be riveted to the envelope and provided with oppositely projecting wings or extensions capable of being bent into parallel relation for insertion through the opening in the envelope flap and then straightened out to hold the flap in closed position, have been formed singly and fed to the applying machine one at a time by hand or otherwise.

My present invention contemplates a machine for operating upon a strip of fasteners of the general character indicated, which, however, instead of being formed individually are integrally united in a continuous strip. The primary purpose of my present invention is the provision of a machine which will feed such a strip of fasteners into position to be successively severed from the strip and applied to the envelope by improved mechanism so that the fasteners can be applied much more rapidly than the individually formed fasteners heretofore employed.

Another object of the invention is to provide a machine which will accurately handle, position and align the fasteners relatively to the applying mechanism so that the fasteners may be rapidly and accurately applied without liability of failure or inaccuracy in the operation of the machine.

Another purpose of the invention is to provide a machine which is capable of adjustment so that it may be quickly changed to operate upon envelopes of various sizes.

Other objects and advantages of the invention should be readily appreciated as the same becomes better understood by reference to the following description when considered in connection with the accompanying drawings.

Referring to the drawings:

Fig. 1 is a plan view of the machine embodying my invention;

Fig. 2 is a fragmentary horizontal sectional view showing the strip feeding wheel and the fastener applying mechanism;

Fig. 3 is a fragmentary plan view of a strip of fasteners which my machine is adapted to handle;

Fig. 4 is a detail view of the fasteners positioning and aligning device; and

Fig. 5 is a face view of the anvil.

Referring now to the drawings more in detail, reference character 5 indicates generally the bed of the machine supported upon suitable legs or standards. In bearings 6 carried by the bed there is journaled a main drive shaft 7 adapted to be driven through a one-revolution clutch 8 from a drive pulley 9. This clutch is controlled by a foot pedal (not shown) connected with the clutch by a rod 11, and in order to insure stopping of the shaft when the clutch is thrown out, a drag brake 12 offers continuous resistance to the rotation of the shaft.

The present machine is designed to not only apply fasteners to the envelopes but also to form and apply gummed reinforcing patches. The patch applying mechanism, however, forms no part of the present application and since it is fully disclosed in my prior application above referred to, an illustration and description of said mechanism is not embodied in this application.

The fastener applying mechanism includes a stationary anvil 13 mounted upon an adjustable support and spaced a limited distance from a guiding horn 14, leaving a slot 15 into which an envelope may be inserted so that its flap is disposed in position for the application thereto of the patches and with the anvil projecting into the envelope to the rear face of which a fastener is applied as will be later explained.

The metal fasteners are formed in a continuous strip indicated by reference character 16, each fastener comprising a tubular body portion from which project oppositely extending wings or extensions 17. This strip of fasteners is wound upon a spool 18 rotatably mounted upon the machine as will be apparent from Fig. 1 and frictionally held against rotation by a suitable spring or other friction means. From this spool the strip is fed around a toothed wheel 19 provided with radially extending teeth 21 adapted to engage in the central apertures of the fasteners so that upon rotation of this wheel the strip is withdrawn and unwound from the spool. Guard plate 22, in proximity to the periphery of the wheel, maintains the strip in engagement with the wheel teeth. The feed wheel is intermittently actuated to feed the fastener strip by a step-by-step motion by means of a feed pawl 23 mounted upon a lever 24 fulcrumed upon the axis of the feed wheel, said pawl being engageable in ratchet teeth 25 formed upon the upper face of the feed wheel. Suitable friction means is employed to prevent reverse rotation of the wheel. Lever 24 is oscillated to actuate the feed wheel by the means of a longitudinally adjustable push rod 26 pivotally connected at its outer end to the lever 24 and adjustably connected by means of a set screw 27 with a fulcrumed member 28 straddling the main shaft 15, and equipped with a cam follower 29 adapted to be actuated by a cam 31 on the shaft 15. A tension spring 32 holds the follower 29 in engagement with the cam.

The face of the anvil 13 is longitudinally grooved as shown to accommodate an anvil plate 33, which is equipped with a riveting die 34 and a stripper spring 35. The anvil plate is adjustably secured to the anvil by screws 36 and the anvil is provided with a series of countersunk apertures 37 adapted to receive these screws so that the anvil plate may be adjusted longitudinally of the anvil to properly position it for various sizes of envelopes.

The strip of fasteners as it leaves the feed wheel is guided by a pivotally mounted guide member 38, yieldingly held in position by a spring 39 so that the endmost fastener of the strip is guided into alignment with the applying punch. This punch, as will be apparent from Fig. 2, comprises a riveting portion 41, fixed in and projecting beyond the end of a reciprocatory punch holder 42, and a pin 43 yieldingly projected beyond the end of the punch by an expansion spring 44, so that this pin will enter the aperture of the aligned fastener. As the punch moves toward the anvil the flat edge or corner 45 thereof will cooperate with a fixed shearing member 46 to shear the endmost fastener from the strip which fastener, being impaled on the pin 43 can be carried toward the anvil and forced through the envelope body and against the riveting die by which the fastener will be securely riveted to the envelope.

In order to assist in aligning and properly positioning the endmost fastener with respect to the applying punch, a U-shaped aligning device 47 is carried upon a slide bar 48 which is slidably mounted by means of slots 49 and screws 51 upon the bearings 52 and 53, in which the punch holder 42 reciprocates. The rear end of this bar is provided with an elongated slot 54 though which projects a pin 55 extending laterally from the punch holder. A tension spring 56, attached at 57 to the bar and at its other end to the bearing 52, urges the bar toward the anvil as far as permitted by the pin 55.

The punch holder is normally held in retracted position by an expansion spring 58 surrounding the holder and interposed between the bearing 52 and a pin 59 carried by the punch holder. During the feeding movement of the fastener strip the punch and the aligning member 47 are both held in the retracted position shown in Fig. 2 so that the endmost fastener will be fed into abutting relation with the aligning device 47, as shown in Fig. 4, and positioned in alignment with the punch to receive the pin 43 when the punch is moved toward the anvil.

The punch is intermittently moved toward the anvil in predetermined timed relation with the feeding mechanism by an arm 61 mounted upon a rock shaft 62, and equipped with an adjustable abutment screw 63 threaded through the arm and engaging the outer end of the punch holder 59. An arm 64 projecting upwardly from the rock shaft is provided with a cam follower disposed in the path of a cam 65 fixed on the shaft 7 so that upon each oscillation of the shaft 62 the punch will be projected toward the anvil to impale a fastener on the pin 43, sever the fastener from the strip, and apply it to the envelope.

The aligning device 47, as will be apparent from Fig. 2, is normally spaced away from the envelope and when the punch holder is retracted, as shown, is held in this position by the pin 55. When the punch moves toward the anvil, however, carrying with it the fastener, the aligning device will similarly move under the influence of the spring 56, thereby serving to maintain the severed fastener with its wings in proper vertical alignment until it is applied to the envelope. When the aligning device becomes engaged with the envelope so that further movement thereof is prevented, the pin 55 will then slide in the slot 54 during the remainder of the punch movement, and upon return movement of the punch, the aligning device will be withdrawn by engagement with the pin 55 at the end of the slot 54.

In the operation of my invention, the clutch 16 being normally disengaged, an envelope is slipped into position over the anvil 13, whereupon the foot treadle is depressed to engage the clutch. The shaft 7 thereupon makes one revolution and through the mechanism described, feeds the fastener strip the width of one fastener into alignment with the applying punch whereupon reciprocatory movement of the punch causes the fastener to be severed from the strip and applied to the body of the envelope. This operation is performed and the parts are restored to normal position during one revolution of the shaft 7, whereupon the clutch 8 automatically throws out, the operator removes the envelope, replaces it by another, and depresses the treadle whereupon the operation is repeated.

The structural details illustrated and described may be varied within considerable limits without departing from the spirit of the invention as defined in the following claims.

I claim:

1. In a machine of the character described, the combination of a stationary anvil adapted to support an article to receive a fastener, a reciprocatory applying punch, a feed wheel for feeding a strip of preformed fasteners each having a tubular portion to said punch, said feed wheel having projections adapted to impale each fastener through its tubular portion, means for imparting an intermittent movement to said wheel, means for positioning the end-most fastener in alignment with said punch, and means for automatically operating said punch in predetermined, timed relation to said strip feed.

2. In a machine of the character described, the combination of a stationary anvil, a reciprocatory fastener applying punch, a feed wheel provided with peripheral projections engageable in the apertures of a strip of apertured fasteners for feeding said strip across the path of movement of said punch, an aligning device normally disposed in the path of movement of said strip, and means for moving said device toward and from the anvil in timed relation with said punch.

3. In a machine of the character described, the combination of an anvil, a feed wheel provided with projections adapted to engage in the apertures of a strip of apertured fasteners, means for actuating said wheel for advancing the end-most fastener into position for application, a stationary cutting member, means cooperating with said member and with said anvil for severing a fastener from said strip and riveting the same into an envelope, means movable with the severed fastener toward its point of application for guiding the same thereto, and means for automatically operating said feed wheel actuating means, said cooperating means and said movable means in predetermined, timed relation to one another.

4. In a machine of the character described, the combination of an anvil, a reciprocatory punch cooperative therewith and adapted to impale a fastener having an aperture, means for feeding a strip of apertured fasteners into alignment with said punch, an aligning device against which the end-most fastener is fed, means for actuating said punch to cause the same to impale said endmost fastener, sever the same from the strip and apply the same to an envelope, and means for moving said device with the punch for holding the fastener in alignment while it is severed and applied.

5. In a machine of the character described, the combination of a stationary anvil adapted to receive an envelope, a reciprocatory punch cooperating therewith, a wheel for feeding a strip of fasteners across the path of said punch, an aligning device by which the endmost fastener of said strip is aligned with the punch, and means for actuating said punch to sever said endmost fastener from the strip and apply the same to the envelope, said aligning device being movable toward and from said anvil with said punch.

6. In a machine of the character described, the combination of a stationary anvil, a reciprocatory punch, an aligning device yieldably connected with said punch, and a feed wheel adapted to feed a strip of apertured fasteners against said aligning device whereby the endmost fastener is aligned with said punch.

7. In a machine of the character described, the combination of a stationary anvil, a reciprocatory fastener applying punch, a feed wheel provided with peripheral projections engageable in the apertures of a strip of apertured fasteners for feeding said strip across the path of movement of said punch, an aligning device normally disposed in the path of movement of said strip, and means for moving said device toward and from the anvil in timed relation with said punch.

ALBERT OLGAY.